US012050592B1

(12) United States Patent
Starratt et al.

(10) Patent No.: US 12,050,592 B1
(45) Date of Patent: Jul. 30, 2024

(54) METHODS AND SYSTEMS FOR GENERATING DIGITAL RECORDS INDICATING COMPUTING OPERATIONS AND STATE DATA IN A MULTI-APPLICATION NETWORK

(71) Applicant: Black Knight IP Holding Company, LLC, Jacksonville, FL (US)

(72) Inventors: Kara S. Starratt, Jacksonville, FL (US); David W. Denson, Jacksonville, FL (US); James A. Iredale, Ponte Vedra Beach, FL (US); Sandra T. Madigan, Jacksonville, FL (US); Erik J. Skinner, Sturgeon Bay, WI (US); Lesley Grimes, Jacksonville, FL (US)

(73) Assignee: BLACK KNIGHT IP HOLDING COMPANY, LLC, Jacksonville, FL (US)

( * ) Notice: Subject to any disclaimer, the term of this patent is extended or adjusted under 35 U.S.C. 154(b) by 0 days.

(21) Appl. No.: 18/373,830

(22) Filed: Sep. 27, 2023

(51) Int. Cl.
*G06F 16/23* (2019.01)

(52) U.S. Cl.
CPC .................. *G06F 16/2365* (2019.01)

(58) Field of Classification Search
None
See application file for complete search history.

(56) References Cited

U.S. PATENT DOCUMENTS

| | | | |
|---|---|---|---|
| 9,130,900 B2 | 9/2015 | Tran | |
| 9,830,187 B1 | 11/2017 | Blaine et al. | |
| 10,068,301 B2 | 9/2018 | Kogut-O'Connell et al. | |
| 10,810,361 B1 | 10/2020 | Venkatraman et al. | |
| 10,963,316 B2 | 3/2021 | Gopalan et al. | |
| 11,379,268 B1 | 7/2022 | Gupta | |
| 11,379,897 B1 | 7/2022 | Thomas | |
| 2002/0002453 A1 | 1/2002 | Lazaridis et al. | |
| 2002/0078432 A1 | 6/2002 | Charisius et al. | |

(Continued)

OTHER PUBLICATIONS

Workgrid. "What is a Digital Assistant?" Jun. 1, 2023 snapshot via Archive.org. URL Link: <https://workgrid.com/article/what-is-a-digital-assistant>. Accessed Nov. 2023. (Year: 2023).*

(Continued)

*Primary Examiner* — Irene Baker
(74) *Attorney, Agent, or Firm* — Baker McKenzie LLP

(57) ABSTRACT

The disclosed methods include: determining context data for a digital request data object based on a received first input; executing, based on the context data and the first input: a first and a second computing operation; generating a first digital record indicating: summary data for the first and second computing operations, and first state data associated with transitioning the digital request data object from a first data state to a second data state; updating context data based on the first digital record; executing, based on the updated context data and/or a received second input: a third and a fourth computing operation; generating a second digital record indicating: summary data for the third and the fourth computing operations, and second state data associated with transitioning the digital request data object from: the second data state to a third data state, and from the third data state to a fourth data state.

25 Claims, 5 Drawing Sheets

(56) References Cited

U.S. PATENT DOCUMENTS

| | | |
|---|---|---|
| 2002/0138449 A1 | 9/2002 | Kendall et al. |
| 2003/0233374 A1 | 12/2003 | Spinola et al. |
| 2004/0215552 A1 | 10/2004 | Horn et al. |
| 2005/0028073 A1 | 2/2005 | Henry et al. |
| 2005/0165734 A1 | 7/2005 | Vicars et al. |
| 2006/0069596 A1 | 3/2006 | Hatoun et al. |
| 2006/0069605 A1 | 3/2006 | Hatoun et al. |
| 2006/0074714 A1 | 4/2006 | Aziz et al. |
| 2008/0114791 A1 | 5/2008 | Takatsu et al. |
| 2009/0276340 A1 | 11/2009 | Knapp |
| 2010/0050153 A1 | 2/2010 | Louie et al. |
| 2010/0070464 A1 | 3/2010 | Aymeloglu et al. |
| 2011/0055180 A1 | 3/2011 | Lumley et al. |
| 2011/0282707 A1 | 11/2011 | Rangaswamy et al. |
| 2012/0236201 A1* | 9/2012 | Larsen .................. G06Q 30/02 348/468 |
| 2013/0152021 A1 | 6/2013 | Hatfield et al. |
| 2013/0212151 A1 | 8/2013 | Herbach et al. |
| 2014/0047028 A1 | 2/2014 | Buth |
| 2014/0351115 A1 | 11/2014 | Dahiwadkar |
| 2015/0134600 A1 | 5/2015 | Eisner et al. |
| 2016/0104067 A1 | 4/2016 | Xu et al. |
| 2019/0268462 A1 | 8/2019 | Yim et al. |
| 2020/0151630 A1 | 5/2020 | Shakhnovich |
| 2020/0320407 A1 | 10/2020 | Xiao et al. |
| 2020/0341834 A1* | 10/2020 | Safary ................. G06F 11/2257 |
| 2020/0372088 A1 | 11/2020 | Liu et al. |
| 2020/0394612 A1 | 12/2020 | Khokhar et al. |
| 2020/0410395 A1 | 12/2020 | Ray |
| 2021/0089375 A1 | 3/2021 | Ghafourifar et al. |
| 2021/0192134 A1 | 6/2021 | Yue et al. |
| 2022/0358286 A1 | 11/2022 | Wilson-Thomas et al. |
| 2023/0119035 A1* | 4/2023 | Mee .......................... H04L 9/50 705/75 |
| 2023/0125194 A1 | 4/2023 | Mertens |
| 2023/0134235 A1 | 5/2023 | Setlur et al. |
| 2023/0368198 A1* | 11/2023 | Gonzales, Jr. ..... G06Q 20/3829 |

OTHER PUBLICATIONS

Oracle. "What is a Digital Assistant?" Feb. 8, 2023 snapshot via Archive.org. URL Link: <https://www.oracle.com/chatbots/what-is-a-digital-assistant/>. Accessed Nov. 2023. (Year: 2023).*

Huang, Qiao, API Method Recommendation without Worrying about the Task-API Knowledge Gap. (Year: 2018).

Non-Final Office Action dated Nov. 22, 2023 in connection with U.S. Appl. No. 18/373,771, 14 pages.

Non-Final Office Action dated Dec. 20, 2023 in connectioin with U.S. Appl. No. 18/373,797, 22 pages.

Non-Final Office Action dated Dec. 11, 2023 in connection with U.S. Appl. No. 18/373,813, 31 pages.

Non-Final Office Action dated Jan. 31, 2024 in connection with U.S. Appl. No. 18/373,822, 23 pages.

\* cited by examiner

RECEIVING A FIRST INPUT ASSOCIATED WITH A DIGITAL REQUEST DATA OBJECT, THE DIGITAL REQUEST DATA OBJECT COMPRISING OR ASSOCIATED WITH A FILE STORED IN ONE OR MORE DATABASES ASSOCIATED WITH THE MULTI-APPLICATION NETWORK
402

DETERMINING CONTEXT DATA FOR THE DIGITAL REQUEST DATA OBJECT BASED ON AT LEAST THE FIRST INPUT, THE CONTEXT DATA COMPRISING: PROFILE DATA COMPRISING USER DATA ASSOCIATED WITH THE DIGITAL REQUEST DATA OBJECT; TRAJECTORY DATA ASSOCIATED WITH ONE OR MORE COMPUTING OPERATIONS PREVIOUSLY EXECUTED ON THE DIGITAL REQUEST DATA OBJECT; AND METADATA ASSOCIATED WITH THE DIGITAL REQUEST DATA OBJECT
404

EXECUTING BASED ON THE CONTEXT DATA AND THE FIRST INPUT: A FIRST COMPUTING OPERATION THAT TRANSITIONS THE DIGITAL REQUEST DATA OBJECT FROM A FIRST DATA STATE TO A DATA SECOND STATE; AND A SECOND COMPUTING OPERATION THAT DOES NOT TRANSITION THE DIGITAL REQUEST DATA OBJECT FROM THE FIRST DATA STATE TO THE SECOND DATA STATE
406

GENERATING A FIRST DIGITAL RECORD INDICATING: SUMMARY DATA FOR THE FIRST COMPUTING OPERATION AND THE SECOND COMPUTING OPERATION; AND FIRST STATE DATA ASSOCIATED WITH TRANSITIONING THE DIGITAL REQUEST DATA OBJECT FROM THE FIRST DATA STATE TO THE SECOND DATA STATE
408

UPDATING THE CONTEXT DATA BASED ON THE SUMMARY DATA FOR THE FIRST COMPUTING OPERATION AND THE SECOND COMPUTING OPERATION, AND THE FIRST STATE DATA ASSOCIATED WITH THE TRANSITIONING THE DIGITAL REQUEST DATA OBJECT FROM THE FIRST DATA STATE TO THE SECOND DATA STATE, BOTH ASSOCIATED WITH THE FIRST DIGITAL RECORD
410

METHODS AND SYSTEMS FOR GENERATING DIGITAL RECORDS INDICATING COMPUTING OPERATIONS AND STATE DATA IN A MULTI-APPLICATION NETWORK

TECHNICAL FIELD

The present disclosure relates to generating digital records associated with computing operations and state data in a multi-application network.

BACKGROUND

Developing strategies for monitoring, tracking, and analyzing data and/or computing operations within a multi-application network is needed to: facilitate legacy optimization operations as well as efficient data management operations within the multi-application network; and/or efficient data contextualization operations within the multi-application network; and/or efficient exception event handling operations for digital request data objects of the multi-application network.

SUMMARY

Disclosed are methods, systems/apparatuses, and computer program products that generate one or more digital records indicating one or more computing operations and state data associated with a digital request data object in a multi-application network. According to one embodiment, a method for generating one or more digital records includes: receiving a first input associated with a digital request data object, the digital request data object comprising or associated with a file stored in one or more databases associated with the multi-application network; determining context data for the digital request data object based on at least the first input, the context data comprising one or more of: profile data including user data associated with the digital request data object, trajectory data associated with one or more computing operations previously executed on the digital request data object, and metadata associated with the digital request data object; executing, based on the context data and the first input: a first computing operation that transitions the digital request data object from a first data state to a data second state, and a second computing operation that does not transition the digital request data object from the first data state to the second data state; and generating a first digital record indicating: summary data for the first computing operation and/or the second computing operation, and first state data associated with transitioning the digital request data object from the first data state to the second data state. The method further comprises: updating the context data based on the summary data for the first computing operation and the second computing operation and the first state data associated with the transitioning the digital request data object from the first data state to the second data state, both associated with the first digital record; receiving a second input associated with the digital request data object; executing, based on the updated context data or the second input: a third computing operation that transitions the digital request data object from the second data state to a third data state, and a fourth computing operation that transitions the digital request data object from a third data state to a fourth data state; generating a second digital record indicating: summary data for the third computing operation and the fourth computing operation, and second state data associated with transitioning the digital request data object from: the second data state to the third data state, and from the third data state to the fourth data state, and updating, using the one or more computing device processors, the context data based on the summary data for the third computing operation and the fourth computing operation, and the second state data associated with the transitioning the digital request data object from the second data state to the third data state and then the third data state to the fourth data state, both associated with the second digital record.

In another embodiment, a system and a computer program product can include or execute the method described above. These and other implementations may each optionally include one or more of the following features. One or more of the first input or the second input is a natural language input. For example, the natural language input may include one or more textual or character string data associated with spoken and/or written language (e.g., English language, French language, Portuguese language, Chinese language, Japanese language, Korean language, Dutch language).

Furthermore, the profile data, according to one embodiment, comprises: first access data indicating an access protocol for a user that defines specific aspects of the digital request data object that is accessible to the user; and second access data indicating an access protocol for the user that defines specific aspects of computation outputs generated from executing at least one of: the first computing operation, the second computing operation, the third computing operation, or the fourth computing operation. In addition, the trajectory data discussed in association with the above method may indicate or link the one or more computing operations previously executed on the digital request data object to generate a computing operation sequence that informs selection of future computing operations for the digital request data object.

In some embodiments, the metadata discussed in association with the above method comprises one or more of: temporal data associated with creating and storing the digital request data object; location data associated with creating, accessing, and operating on the digital request data object; user data associated with creating the digital request data object; and a file or document type associated with the digital request data object. It is appreciated that the digital request data object comprises a document or a file outlining one or more of: account data associated with a client request, or data indicating a stage-wise progression of analysis operations required to resolve an exception event associated with the digital request data object. In addition, one of the first computing operation, the second computing operation, the third computing operation, or the fourth computing operation comprises a computing operation that is used to determine an exception event associated with the digital request data object. According to one embodiment, the first computing operation, the second computing operation, the third computing operation, or the fourth computing operation comprises a computing operation used to resolve an exception event associated with the digital request data object.

Furthermore, the first digital record and the second digital record may be displayed on a single user interface that is configured to display a plurality of computing operation results generated from analysis operations executed by one or more applications associated with the first computing operation, the second computing operation, the third computing operation, or the fourth computing operation. In addition, the first input or the second input may be received by a digital assistant associated with the multi-application network. The digital assistant may comprise an artificial intelligence or a machine learning engine that is configured to track or assimilate a trajectory of one or more inputs including the first input and/or the second input to recommend one or more analysis operations that resolve at least one exception event associated with the digital request data object.

In some embodiments, transitioning the digital request data object from the first data state to the second data state comprises updating at least one data element of the digital request data object. The at least one data element may comprise one or more of identifier data or processing stage data. Moreover, one or more of the first state data and the second state data may indicate one or more changes to data elements associated with the digital request data object.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

FIGS. 4A and 4B show exemplary flowcharts for methods, systems/apparatuses, and computer program products for generating one or more digital records indicating one or more computing operations and state data associated with a digital request data object in a multi-application network such as the multi-application network of FIG. 1.

DETAILED DESCRIPTION

Multi-Application Network

It is increasingly becoming needful to leverage computational tools that automatically recognize relationships among a plurality of disparate data and/or computing operations associated with a given multi-application network, and suggest, estimate, or otherwise recommend operations that can be executed to make said disparate data more meaningful, insightful, and readily ingestible or accessible by other computing systems or applications for further processing or analysis. There is therefore a need to develop a digital assistant that can generate digital records associated with one or more computing operations and/or recommend operations based on data relationships in order to eliminate or otherwise minimize time constraints in processing or analyzing data in the multi-application network.

Figure 1:
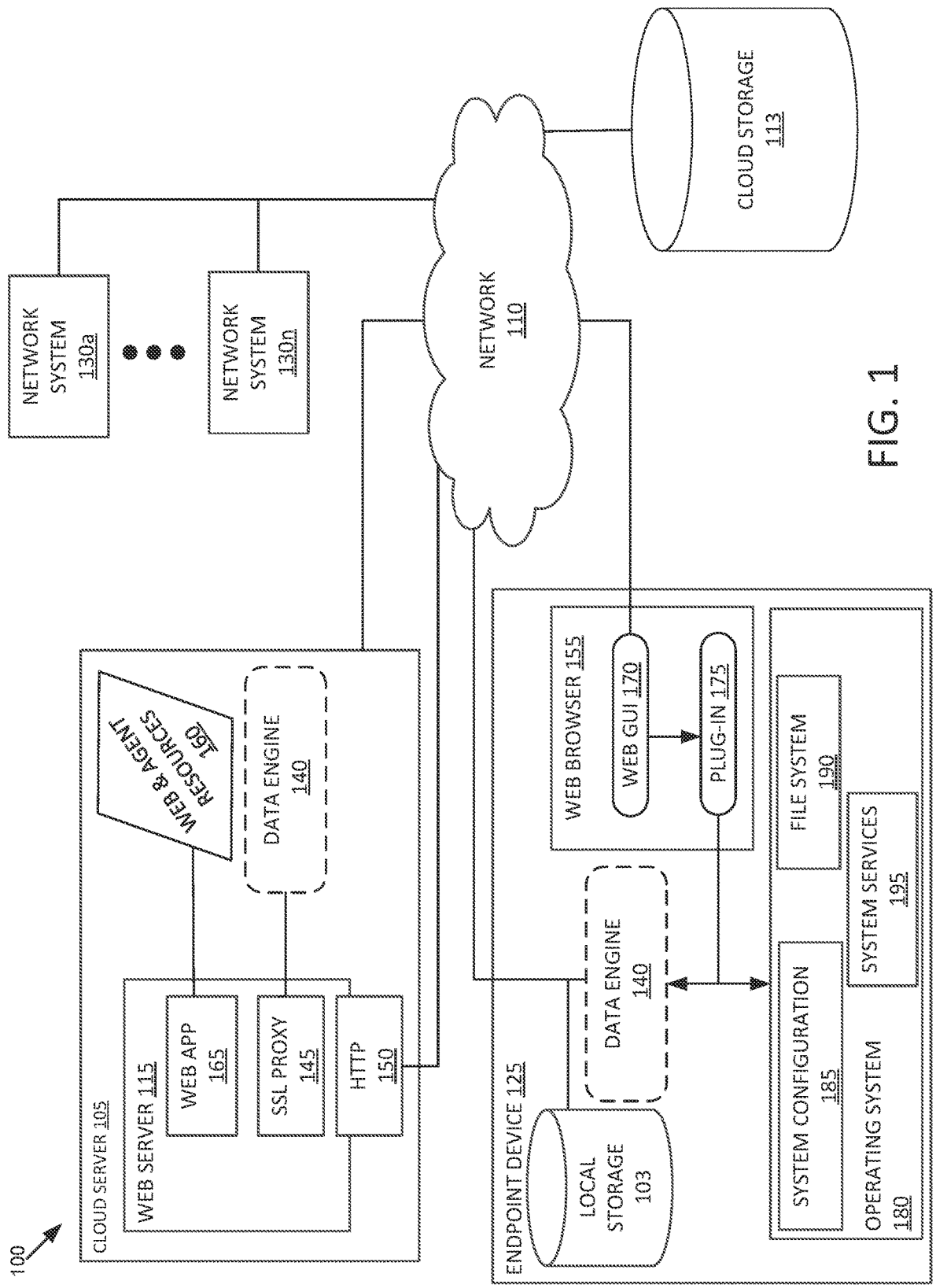
FIG. 1 is a high level diagram of an exemplary system indicting an implementation of a multi-application network, in accordance with some embodiments of this disclosure.

Illustrated in FIG. 1 is a high level diagram of an exemplary system 100 indicting an implementation of a multi-application network. In the illustrated implementation, the system 100 may include a cloud server 105 communicatively coupled to a plurality of network systems 130a . . . 130n via a network 110. The system 100 may also include an endpoint device 125 and cloud storage 113 communicatively coupled via the network 110. While a single cloud server 105 and a single endpoint device 125 are illustrated, the disclosed principles and techniques could be expanded to include multiple cloud servers, multiple endpoints, and multiple cloud storage devices.

In some embodiments, the cloud server 105 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, and/or the like. The cloud server 105 may include a plurality of computing devices configured to communicate with one another and/or implement the techniques described herein.

Figure 2:
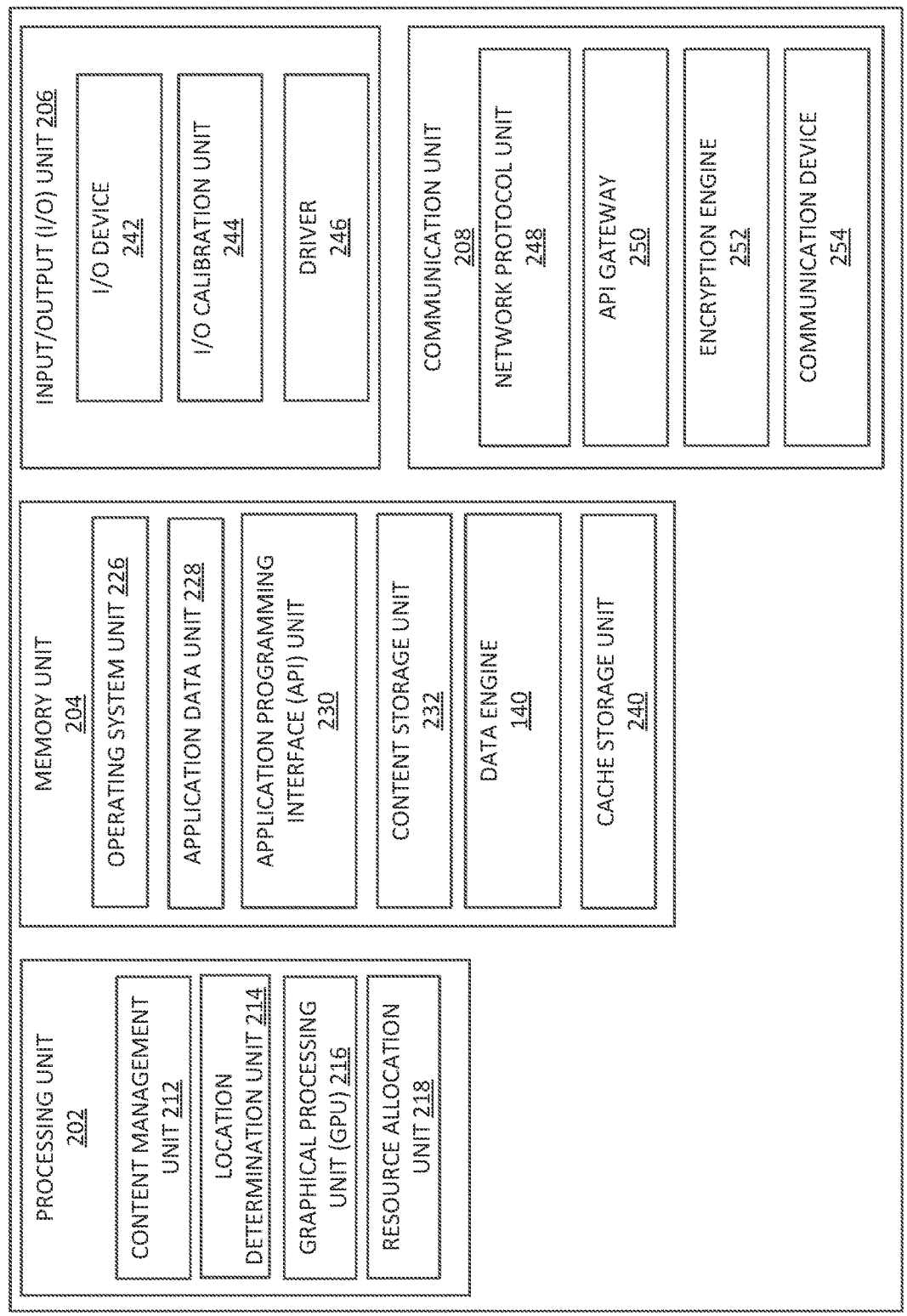
FIGS. 2 and 3 illustrate exemplary functional and system diagrams, respectively, of a computing environment for generating one or more digital records in a multi-application network.
Figure 3:
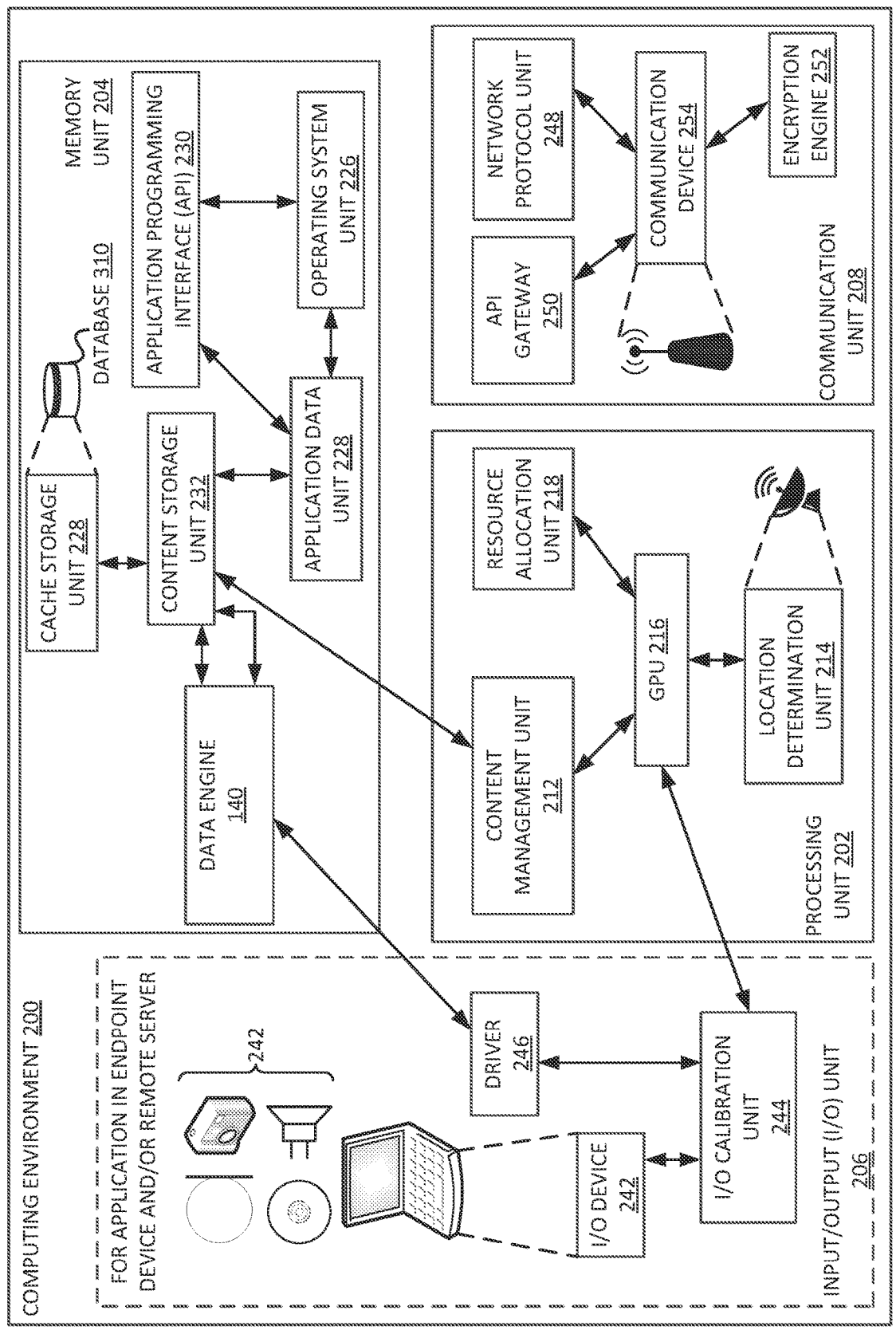

The cloud server 105 may include various elements of a computing environment as described in association with the computing environment 200 of FIGS. 2 and 3. For example, the cloud server 105 may include processing unit 202, a memory unit 204, an input/output (I/O) unit 206, and/or a communication unit 208 which are discussed in association with FIGS. 2 and 3. The cloud server 105 may further include subunits and/or other modules for performing operations associated with implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. The cloud server may be locally or remotely operated as the case may require.

Turning back to FIG. 1, the cloud server 105 may include a web server 115, a data engine 140, and a web and agent resources 160. The web server 115, the data engine 140 and the web and agent resources 160 may be coupled to each other and to the network 110 via one or more signal lines. The one or more signal lines may comprise wired and/or wireless connections.

The web server 115 may include a secure socket layer (SSL) proxy 145 for establishing HTTP-based connectivity 150 between the cloud server 105 and other devices or systems coupled to the network 110. Other forms of secure connection techniques, such as encryption, may be employed on the web server 115 and across other systems coupled to the network 110. Additionally, the web server 115 may deliver artifacts (e.g., binary code, instructions, data, etc.) to the data engine 140 either directly via the SSL proxy 145 and/or via the network 110. Additionally, the web and agent resources 160 of the cloud server 105 may be provided to the endpoint device 125 via the web app 165 on the web server 115. The web and agent resources 160 may be used to render a web-based graphical interface (GUI) 170 via the browser 155 running on the endpoint device 125.

The data engine 140 may either be implemented on the cloud server 105 and/or on the endpoint device 125. The data engine 140 may include one or more instructions or computer logic that are executed by the one or more processors such as the processors discussed in association with FIGS. 2 and 3. In particular, the data engine facilitates executing the processing procedures, methods, techniques, and workflows provided in this disclosure. Some embodiments include an iterative refinement of one or more data models (e.g., learning model, large language model) associated with the multi-application network disclosed via feedback loops executed by one or more computing device processors and/or through other control devices or mechanisms that make determinations regarding optimization of a given action, template, or model.

In some embodiments, the data engine 140 may access an operating system 180 of the endpoint device 125 in order to execute the disclosed techniques on the endpoint device 125. For instance, the data engine 140 may gain access into the operating system 180 including the system configuration module 185, the file system 190, and the system services module 195 in order to execute computing operations associated with implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. The plug-in 175 of the web browser 155 may provide needed downloads that facilitate operations executed by the operating system 180, the data engine 140, and/or other applications running on the endpoint device 125.

The network 110 may include a plurality of networks. For instance, the network 110 may include any wired and/or wireless communication network that facilitates communication between the cloud server 105, the cloud storage 113, and the endpoint device 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like.

The network systems 130a . . . 130n may include one or more computing devices or servers, services, or applications the can be accessed by the cloud server 105 and/or the endpoint device 125 and or the cloud database 113 via the network 110. In one embodiment, the network systems 130a . . . 130n comprises third-party applications or services that are native or non-native to either the cloud server 105 and/or the endpoint device 125. The third-party applications or services, for example, may facilitate executing one or more computing operations associated with resolving an exception event associated with a digital request data object. As further discussed below, the digital request data object may comprise a document or a file outlining one or more of: account data associated with a client request; or parametric data associated with resolving one or more exception events associated with the digital request data object. According to some implementations, the applications or services associated with the network systems 130a . . . 130n and/or associated with the cloud server 105, and/or the endpoint device 125 must be registered to activate or otherwise enable their usage in the multi-application network. In such cases, the applications and/or services may be encapsulated in a registration object such that the registration object is enabled or activated for use by the data engine 140 based on one or more of: context data associated with a first user input; device profile data associated with a first interface through which the first user input was received; and user profile data associated with the user providing the first user input. On the flip side, the applications and/or services may be encapsulated in a registration object such that the registration object is deactivated or blocked from usage by data engine 140 based on one or more of: context data associated with a second user input; context data associated with a second input; device profile data associated with a second interface through which the second input was received; and user profile data associated with a user providing the second input. The first and second user inputs may both be textual or auditory and may comprise a natural language input.

Returning to FIG. 1, the cloud storage 113 may comprise one or more storage devices that store data, information and instructions used by the cloud server 105 and/or the endpoint device 125. The stored information may include information about users, information about data models (e.g., learning model, an artificial intelligence model, etc.), information about a digital assistant associated with the multi-application network, information associated with a digital request data object, information about analysis operations executed by the data engine 140, etc. In one embodiment, the one or more storage devices mentioned above in association with the cloud storage 113 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis. While the cloud storage 113 is shown as being coupled to the cloud server 105 and the endpoint device 125 via the network 110, the data in the cloud storage 113 may be replicated, in some embodiments, on the cloud server 105 and/or the endpoint device 125. That is to say that a local copy of the data in the cloud storage 113 may be stored on the cloud server 105 and/or the endpoint device 125. This local copy may be synched with the cloud storage 113 so that when there are any changes to the information in the cloud storage 113, the local copy on either the cloud server 105 or the endpoint device 125 is also similarly updated or synched in real-time or in near-real-time to be consistent with the information in the cloud storage 113 and vice versa.

Turning back to FIG. 1, the endpoint device 125 may be a handheld computing device, a smart phone, a tablet, a laptop computer, a desktop computer, a personal digital assistant (PDA), a smart device, a wearable device, a biometric device, a computer server, a virtual server, a virtual machine, a mobile device, and/or a communication server. In some embodiments, the endpoint device 125 may include a plurality of computing devices configured to communicate with one another and/or implement the techniques described in this disclosure. It is appreciated that according to some implementations, the endpoint device may be used by a user to access a digital assistant associated with the multi-application network for executing a plurality of operations associated with digital request data object. The data engine 140 may use the assistant to communicate with the user and to execute a plurality of analysis operations as further discussed below.

The local storage 103, shown in association with the endpoint device 125, may include one or more storage devices that store data, information, and instructions used by the endpoint device 125 and/or other devices coupled to the network 110. The stored information may include various logs/records or event files (e.g., exception event data associated with a digital request data object), security event data, etc. The one or more storage devices discussed above in association with the local database 103 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The other elements of the endpoint device 125 are discussed in association with the computing environment 200 of FIGS. 2 and 3. For example, elements such as a processing unit 202, a memory unit 204, an input/output (I/O) unit 206, and/or a communication unit 208 may execute one or more of the modules of endpoint device 125 and/or one or more elements of the cloud server 105 shown in FIG. 1. The endpoint device 125 may also include subunits and/or other computing instances as provided in this disclosure for performing operations associated with digital request data object and/or the multi-application network.

FIGS. 2 and 3 illustrate exemplary functional and system diagrams of a computing environment 200, according to some embodiments of this disclosure, for implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 110. The computing environment 200 may be implemented on general-purpose hardware and/or specifically-purposed hardware as the case may be. Importantly, the computing environment 200 and any units and/or subunits of FIGS. 2 and/or 3 may be included in one or more elements of system 100 as described in association with FIG. 1. For example, one or more elements (e.g., units and/or subunits) of the computing environment 200 may be included in the cloud server 105 and/or the endpoint device 125 and/or the network systems 130a . . . 130n.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIGS. 2 and 3 alone and/or by the processing unit 202 in conjunction with one or more additional processors, units, subunits, elements, components, devices, and/or the like. Further, while one processing unit 202 may be shown in FIGS. 2 and 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, exception event content, content associated with a digital request data object, content associated with a registration object (e.g., a registration data object associated with registering a command or an application for use by the digital assistant), media content, security event content, or any combination thereof. In some instances, content on which the content management unit 212 may operate includes device information, user interface data, image data, text data, themes, audio data or audio files, video data or video files, documents, and/or the like. Additionally, the content management unit 212 may control the audio-visual environment and/or appearance of application data during execution of various processes (e.g., via web GUI 170 at the endpoint device 125). In some embodiments, the content management unit 212 may interface with a third-party content server (e.g., third-party content server associated with the network systems 130a . . . 130n), and/or specific memory locations for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data described herein. In some embodiments, the GPU 216 may be utilized to render content for presentation on a computing device (e.g., via web GUI 170 at the endpoint device 125). The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data (e.g., data associated with a digital request data object or a registration object), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operation of computing environment 200. For example, memory unit 204 may be used for storing, recalling, and/or updating exception event information as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases (e.g., the public record repository 113 discussed with reference to FIG. 1) located remotely from computing environment 200 may be used and/or accessed by memory unit 204. In some embodiments, memory unit 204 and/or its subunits may be local to the cloud server 105 and/or the endpoint device 125 and/or remotely located in relation to the cloud server 105 and/or the endpoint device 125.

Turning back to FIG. 2, the memory unit 204 may include subunits such as an operating system unit 226, an application data unit 228, an application programming interface (API) unit 230, a content storage unit 232, data engine 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include one or more modules such as a data engine discussed in association with FIG. 4.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, the endpoint device 125 may be required to download, install, access, and/or otherwise use a software application (e.g., web application 165) to facilitate implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. As such, the application data unit 228 may store any information and/or data associated with an application. The application data unit 228 may further store various pieces of information and/or data associated with the operation of an application and/or computing environment 200 as a whole, such as status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the cloud server 105 and the endpoint device 125 to communicate with each other. It is appreciated that the API unit 230 may facilitate accessing, using the data engine 140, one or more applications or services on the cloud server 105 and/or the network systems 130a . . . 130n.

The content storage unit 232 may facilitate deployment, storage, access, and/or utilization of information associated with performance of implementing operations associated with a multi-application network and/or framework processes by computing environment 200 and/or any other computing environment described herein and/or framework processes by computing environment 200 and/or any other computing environment described herein. In some embodiments, content storage unit 232 may communicate with content management unit 212 to receive and/or transmit content files (e.g., media content, digital request data object content, command content, input content, registration object content, etc.).

As previously discussed, the data engine 140 facilitates executing the processing procedures, methods, techniques, and workflows provided in this disclosure. In particular, the data engine 140 may be configured to execute computing operations associated with the disclosed methods, systems/apparatuses, and computer program products.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the disclosed processes. For example, elements of the I/O unit 206 may be used to receive input from a user of the endpoint device 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with the disclosed techniques and systems.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently. In some embodiments, I/O calibration unit 244 may use a driver 246 (or multiple drivers) to calibrate I/O device 242. For example, the driver 246 may include software that is to be installed by I/O calibration unit 244 so that an element of computing environment 200 (or an element of another computing environment) may recognize and/or integrate with I/O device 242 for the processes described herein.

The communication unit 208 may facilitate establishment, maintenance, monitoring, and/or termination of communications between computing environment 200 and other computing environments, third party server systems, and/or the like (e.g., between the cloud server 105 and the endpoint device 125 and or the network systems 130a . . . 130n). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or other software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, power line communication (PLC) protocols, and/or or the like. In some embodiments, facilitation of communication for computing environment 200 may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access the API unit 230 of the memory unit 204 associated with the computing environment 200. For example, an endpoint device 125 may access the API unit 230 of the computing environment 200 via the API gateway 250. In some embodiments, the API gateway 250 may be required to validate user credentials associated with a user of the endpoint device 125 prior to providing access to the API unit 230 to a user. The API gateway 250 may include instructions for the computing environment 200 to communicate with another computing device and/or between elements of the computing environment 200.

Exemplary Embodiment

Processing or analyzing data in a multi-application network may involve the use of a plurality of technologies or applications associated one or more domains, sectors, processing stages, and/or workflow stages or sub-stages associated with a digital request data object. According to one embodiment, the digital request data object comprises a file, or a document, or a record, or profile data associated with a user request, or profile data associated with a digital service comprised in or associated with the multi-application network. It is appreciated that the file, the document, record, profile data associated with a user request, or profile data associated with a service comprised in, or associated with the multi-application network outlines or is associated with one or more of: account data associated with the digital request data object; or parametric data associated with resolving one or more exception events associated with the digital request data object. According to one embodiment, the multi-application network may: connect a plurality of users via one or more computer networks such as those discussed above in association with FIGS. 1, 2, and 3; include computational capabilities that improve user experience; include one or more analysis operations comprising workflows/logic associated with one or more applications; and include a machine learning or an artificial intelligence engine or module drives context identification associated with a digital request data object and allows further customized interrogation of the multi-application network based on identified context. In some embodiments, the disclosed multi-application network is scalable, and can condense multiple user interfaces into a single user interface based on the digital context associated with a given digital request data object to allow optimized and otherwise seamless generation of analysis data or computing results associated with the processing stages associated with the digital request data object. Moreover, the analysis data, computing results, or context or intent data associated with the digital request data object may be displayed on a single interface thereby negating the laborious process of a user navigating between a plurality of applications and/or interfaces associated with a plurality of applications generating the analysis data, computing results, or context data. This may be achieved by the user interacting with a digital assistant of the multi-application network such that the digital assistant automatically evaluates user inputs (e.g., textual or audio natural language inputs) and intelligently engages applications associated with the multi-application network to execute the needed process for the various processing stages associated with resolving one or more exception events associated with the digital request data object. For example, the digital assistant may comprise or be associated with an artificial or machine learning engine which adapts to, or intelligently uses the user inputs by leveraging context data associated with one or more of: a user profile; the user inputs; one or more digital request data objects; or an exception event.

The exception event, for example, may comprise a disruption in processing a digital request data object at a particular processing stage based on the digital request data object's failure to meet certain requirements or criteria at said stage. For example, some of the requirements may include: a lack of additional input from a user associated with the digital request data object; profile data of the user associated with the digital request data object; a lack of analysis data or computing results data from other applications associated with the multi-application network; a time threshold required to process the digital request data object; profile data associated with a device on which the digital request data object is being processed; credential data associated with a user of the multi-application network; lack of context data associated with the digital request data object; lack of client profile data associated with a client corresponding to the digital request data object.

According to one embodiment, the multi-application network provides users with a functionality to operate on one or more requests (e.g., digital requests data objects) regardless of status (e.g., exception event status) of said requests in a user-friendly and context-enabled machine learning user interface. The multi-application network can provide a user with relevant data based on a digital context within which the user is interacting or communicating with the digital assistant of the multi-application network. In one embodiment, the multi-application network can generate a context-specific interface based on the type of inquiry or operations associated with inputs being received so that a user does not need to actively navigate to multiple user interfaces or access relevant data processing applications that interpret or otherwise analyze data at a given processing stage of a digital request data object. In some embodiments, an application programming interface (API) such as those discussed in conjunction with FIGS. 2 and 3 facilitates the selection of relevant programs or digital logic for processing data associated with the digital request data object based on the digital context.

According to some embodiments, the multi-application network enables automating exception event detection associated with one or more digital request data objects with little to no user intervention using APIs that access and process stage-specific or domain-specific applications associated with the digital request data object. Results from such processes may be presented together with one or more recommendations on possible operations or workflows to execute to resolve and or track an identified exception on a single graphical user interface associated with the multi-application network. According to one embodiment, an identified of the digital request data object indicates a digital event, a digital disruption, a data anomaly, or data condition that needs to be resolved or satisfied for a stage-wise progression of the digital request data object, for example, to move the digital request data object to a different processing stage associated with the digital request data object. In one embodiment, the multi-application network can improve efficiency of operations, computing or otherwise, within the multi-application network by decreasing:

1) the cognitive load for teams (e.g., Agile team) using the multi-application network,
2) back-office (full-time equivalent FTE) operations associated with the multi-application network by at least 25%, and
3) user training time associated with the multi-application network by at least half of the time required to train users without the multi-application network.

Furthermore, the multi-application network can increase cross-domain data fungibility or cross-specialty data fungibility or cross-stage data fungibility associated with the digital request data object.

The disclosed technology beneficially provides a broad set of functionalities by developing, delivering, and releasing distributed and stand-alone solutions for inter-domain, inter-stage data management through the use of a single multi-application network. Furthermore, the disclosed methods and systems provide a conversational architecture to facilitate interactions between a user and the multi-application network using a digital assistant. In particular, the multi-application network can receive natural language queries/inputs associated with a digital request data object from a user, analyze said natural language queries and provide workflow recommendations as well as other responses associated said natural language queries. In some embodiments, the multi-application network can generate intent or context data indicating a digital context associated with the natural language queries and/or associated with a given digital request data object to generate one or more workflow recommendations and/or link a user query/input to one or more digital request data objects and/or applications. It is appreciated that the multi-application network can maintain a digital context associated with a given digital request data object based on one or more of a digital request of a client, a user input from a user, or a digital request data object associated with the user input. According to some embodiment, the multi-application network can curate data based on a profile of a user (e.g., a digital profile of a user), a digital profile of the digital request data object, a digital profile of a computing device being used by the user, location data of a user, and other security protocols associated with the user and/or the digital request data object. It is appreciated that the multi-application network may facilitate implementing a digital assistant, executing registration operations for digital commands, executing context awareness operations, executing operations associated with curating data, and executing operations associated with generating analysis reports or receipts responsive to executing one or more computing operations associated with a digital request data object and/or registration object associated with registering a command.

Digital Record Generation

According to one embodiment of this disclosure, one or more digital records may be generated after the digital assistant is used, for example, to execute one or more computing operations associated with a digital request data object. In one embodiment, the one or more digital records may articulate or otherwise indicate summary data associated with the one or more computing operations and/or state data associated with one or more data state transitions associated with the digital request data object based on at least the one or more computing operations and/or at least one or more inputs received via the digital assistant. In addition, the one or more digital records may include one or more identifiers (e.g., application identifiers, computing operation identifiers, result type identifiers, etc.) associated with the one or more computing operations. The one or more digital records may further include temporal data indicating specific times that specific operations comprised in the one or more computing operations associated with the digital request data object are executed. The state data may also have an associated temporal data that indicates specific times that the one or more data state transitions occurred.

According to one embodiment, the one or more digital records are automatically generated and displayed at specific sections of a single user interface associated with the multi-application network. The one or more digital records may inform the next series of operations that may be executed on the digital request data object. According to one embodiment, the digital record may be generated by aggregated data associated with the one or more computing operations to which a digital request data object is subjected to using on one or more API associated with one or more applications executing the one or more computing operations. The one or more applications, for example, may be native or non-native to the multi-application network.

Flowchart

Figure 4B:
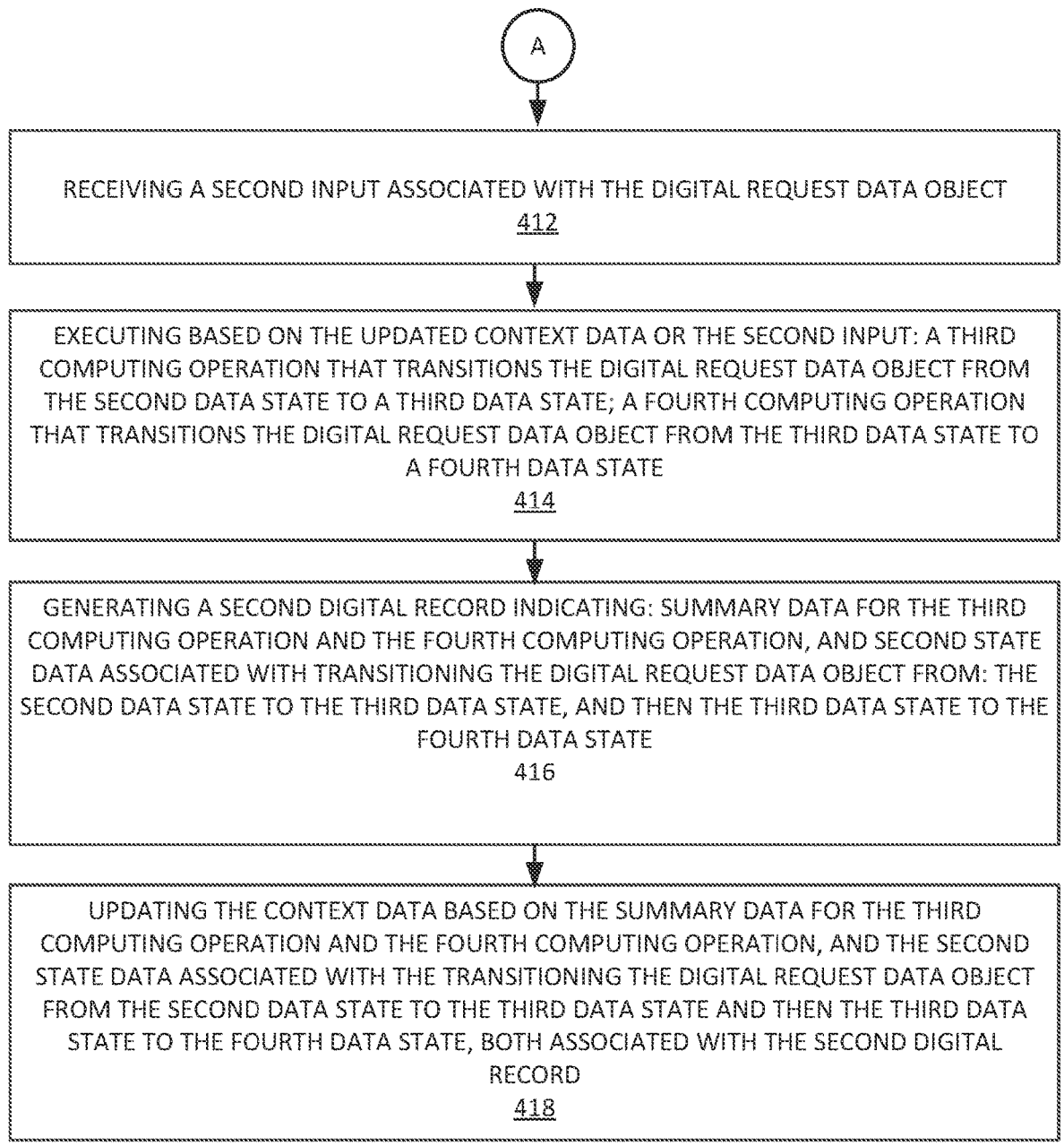

FIGS. 4A and 4B shows exemplary flowcharts for methods, systems/apparatuses, and computer program products associated with generating one or more digital records indicating one or more computing operations and state data associated with a digital request data object in a multi-application network. It is appreciated that a data engine stored in a memory device may cause a computer processor to execute the various processing stages of FIGS. 4A and 4B. At block 402, the data engine may receive, a first input associated with a digital request data object. The digital request data object may comprise or be associated with a file stored in one or more databases associated with the multi-application network. In one embodiment, the digital request data object may comprise a comprise a file, or a document, or a record, or profile data associated with a user request (e.g., a digital request data object), or profile data associated with a digital service comprised in or associated with the multi-application network. The file, document, record, or profile data associated with the digital request data object, or profile data associated with a service comprised in, or associated with the multi-application network can outline or be associated with one or more of: account data associated with the digital request data object; or parametric data associated with resolving one or more exception events associated with the digital request data object; or data indicating a stage-wise progression of analysis operations required to resolve an exception event associated with the digital request data object. Furthermore, the first input can comprise a natural language input including one or more textual or character string data associated with spoken and/or written language (e.g., English language, French language, Portuguese language, Chinese language, Japanese language, Korean language, Dutch language).

At block 404, the data engine may determine, context data for the digital request data object based on at least the first input. The context data, for example, may comprise one or more of: profile data including user data associated with the digital request data object; trajectory data associated with one or more computing operations previously executed on the digital request data object; and metadata associated with the digital request data object. The profile data, for example, can comprise: first access data indicating an access protocol for a user that defines specific aspects of the digital request data object that is accessible to the user; and/or second access data indicating an access protocol for the user that defines specific aspects of computation outputs generated from executing at least one of the first computing operation, the second computing operation, the third computing operation, or the fourth computing operation. Furthermore, the trajectory data may indicate or link the one or more computing operations previously executed on the digital request data object to generate a computing operation sequence that informs selection of future computing operations for the digital request data object. According to one embodiment, the metadata comprises one or more of: temporal data associated with creating and storing the digital request data object; location data associated with creating, accessing, and operating on the digital request data object; user data associated with creating the digital request data object; and/or a file or document type associated with the digital request data object.

At block 406, the data engine may further execute, based on the context data and the first input: a first computing operation that transitions the digital request data object from a first data state to a data second state; and/or a second computing operation that does not transition the digital request data object from the first data state to the second data state. Transitioning the digital request data object from the first data state to the second data state can comprise updating at least one data element of the digital request data object. The at least one data element can comprise one or more of identifier data or processing stage data. According to one embodiment, the data element may comprise an identifier associated with the digital request data object or a parameter associated with the digital request data object. Furthermore, updating the data element may comprise adding or removing one or more identifiers and/or parameters associated with the digital request data object. In one embodiment, one or more of the first state data and the second state data indicate one or more changes to one or more data elements associated with the digital request data object.

At block 408, the data engine may generate, a first digital record indicating: summary data for the first computing operation and the second computing operation; and/or first state data associated with transitioning the digital request data object from the first data state to the second data state. It is appreciated that the summary data and/or first state data (e.g., or second state data, or third state data associated with the digital request data object) and/or other data comprised in the first digital record can facilitate executing legacy optimization operations as well as efficient data management of data, and/or efficient data contextualization operations, and/or exception event handling for the digital request data object associated with the multi-application network. For example, when the digital request data object is loaded in the multi-application network in some embodiments, the first digital record, for example, can be used to validate context data associated with the digital request data object to drive customizing computing operations associated with the digital request data object on a display device for the user. In other embodiments, the first digital record and/or a second digital record and/or a third digital record can be aggregated to provide a digital operations history for the digital request data object. Such a digital operations history can facilitate auditing and compliance operations associated with the digital request data object. In further embodiments, the first digital record and/or a second digital record and/or a third digital record, etc., associated with the digital request data object may serve as legacy data associated with the digital request data object which can be used to resolve complex exception events associated with the digital request data object.

Turning back to FIG. 4A, the data engine may update, at block 410, the context data based on the first digital record. In one embodiment, the updated context data may be stored in one or more databases associated with the multi-application network. At block 412 of FIG. 4B, the data engine may receive, a second input associated with the digital request data object. In one embodiment, the second input may comprise a natural language input like the first input. At block 414, the data engine may execute, based on the updated context data and/or the second input: a third computing operation that transitions the digital request data object from the second data state to a third data state; a fourth computing operation that transitions the digital request data object from the third data state to a fourth data state. Transitioning the digital request data object from the second data state to a third data state or from the third data state to a fourth data state may comprise updating, adding, or removing parametric and/or identifier data associated with the digital request data object. In one embodiment, transitioning the digital request data object from the second data state to the third data state or from a third data state to the fourth data state may comprise analyzing specific one or more data elements of the digital request data object without updating any data elements of the digital request data object to generate analysis data associated with the digital request data object.

At block 416, the data engine may generate, a second digital record indicating: summary data for the third computing operation and the fourth computing operation, and second state data associated with transitioning the digital request data object from: the second data state to the third data state, and the third data state to the fourth data state. The summary data for the third computing operation and the fourth computing operation as well as the second state data of the second digital record may be similar or dissimilar in structure to those generated or associated with the first digital record.

At block 418, the data engine may update the context data based on the summary data for the third computing operation and the fourth computing operation, and the second state data associated with the transitioning the digital request data object from the second data state to the third data state and then the third data state to the fourth data state, both associated with the second digital record.

These and other implementations may each optionally include one or more of the following features. One or more of the first computing operation or the second computing operation, or the third computing operation, or the fourth computing operation comprises a computing operation that is used to determine and/or resolve an exception event associated with the digital request data object. In one embodiment, one or more of the first digital record or the second digital record is displayed on a single user interface that is configured to display a plurality of computing operation results generated from analysis operations executed by one or more applications associated with the first computing operation, the second computing operation, the third computing operation, or the fourth computing operation. In addition, one or more of the first digital record or the second digital record may be resolved into specific data components (e.g., state data comprised therein and/or one or more computing operations comprised data) for display at specific sections of the single user interface so as not to obstruct subsequent reception and/or execution of additional inputs and other computing operations, respectively, associated with the digital request data object.

In addition, one or more of the first input or the second input may be received by a digital assistant associated with the multi-application network. In one embodiment, the digital assistant comprises an artificial intelligence or a machine learning engine that is configured to track or assimilate a trajectory of one or more inputs including the first input and the second input to recommend one or more analysis operations that resolve at least one exception event associated with the digital request data object. In one embodiment, the digital assistance may use the first digital record or the second digital record or a consolidation of the first digital record and the second digital record to inform decisions by the artificial engine associated with the digital assistant to optimize one or more computing operations associated with the digital request data object or a plurality of other digital request data objects associated with the multi-application network.

It is appreciated that the digital request data object may comprise a file or document indicating a loan request, a request to process medical registration data, a request to process student data associated with an educational institution, a request to process scientific data associated with a research, etc.

This patent application incorporates by reference the following commonly owned applications, naming the same inventors, and filed on the same date as the present application (note that the list includes the present application): (1) U.S. patent application Ser. No. 18/373,771, titled "Methods And Systems For Implementing An Intelligent Digital Assistant In A Multi-Application Network," filed on Sep. 27, 2023; (2) U.S. patent application Ser. No. 18/373,797, titled "Methods And Systems For Registering A Digital Command In A Multi-Application Network," filed on Sep. 27, 2023; (3) U.S. patent application Ser. No. 18/373,813, titled "Methods And Systems For Generating Dynamic Context Data Associated With A Digital Request Data Object In A Multi-Application Network," filed on Sep. 27, 2023; (4) U.S. patent application Ser. No. 18/373,822, titled "Methods And Systems For Curating Data In A Multi-Application Network," filed on Sep. 27, 2023; and (5) U.S. patent application Ser. No. 18/373,830, titled "Methods And Systems For Generating Digital Records Indicating Computing Operations And State Data In A Multi-Application Network," filed on Sep. 27, 2023.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the disclosed subject-matter and its practical applications, to thereby enable others skilled in the art to use the technology disclosed and various embodiments with various modifications as are suited to the particular use contemplated. It is appreciated that the term optimize/optimal and its variants (e.g., efficient or optimally) may simply indicate improving, rather than the ultimate form of 'perfection' or the like.

Furthermore, the functions or operations described above can be implemented in digital electronic circuitry, in computer software, firmware or hardware. In particular, the disclosed techniques can be implemented using one or more computer program products. The computer program products, in some embodiments, comprises non-transitory computer-readable media comprising code configured to execute the disclosed approach. Programmable processors and computers can be included in or packaged as mobile devices according to some embodiments. The processes and logic flows can be performed by one or more programmable processors and by one or more programmable logic circuitry. General and special purpose computing devices and storage devices can be interconnected through communication networks.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

What is claimed is:

1. A method for generating one or more digital records indicating one or more computing operations and state data associated with a digital request data object in a multi-application network, the method comprising:
  receiving, using one or more computing device processors, a first input associated with the digital request data object, the digital request data object comprising or associated with a file stored in one or more databases associated with the multi-application network;
  determining, using the one or more computing device processors, context data for the digital request data object based on at least the first input, the context data comprising:
    profile data comprising user data associated with the digital request data object,
    trajectory data associated with one or more computing operations previously executed on the digital request data object, and
    metadata associated with the digital request data object;
  executing, using the one or more computing device processors, based on the context data and the first input:
    a first computing operation that transitions the digital request data object from a first data state to a second data state, and a second computing operation that does not transition the digital request data object from the first data state to the second data state;

generating, using the one or more computing device processors, a first digital record indicating:
summary data for the first computing operation, and
first state data associated with transitioning the digital request data object from the first data state to the second data state;

updating, using the one or more computing device processors, the context data based on the summary data for the first computing operation, and the first state data associated with the transitioning the digital request data object from the first data state to the second data state, both associated with the first digital record;

receiving, using the one or more computing device processors, a second input associated with the digital request data object;

executing, using the one or more computing device processors, based on the updated context data or the second input:
a third computing operation that transitions the digital request data object from the second data state to a third data state, and
a fourth computing operation that transitions the digital request data object from the third data state to a fourth data state;

generating, using the one or more computing device processors, a second digital record indicating:
summary data for the third computing operation and the fourth computing operation, and
second state data associated with transitioning the digital request data object from:
the second data state to the third data state, and
then the third data state to the fourth data state; and updating, using the one or more computing device processors, the context data based on the summary data for the third computing operation and the fourth computing operation, and the second state data associated with the transitioning the digital request data object from the second data state to the third data state and then the third data state to the fourth data state, both associated with the second digital record, wherein at least one of the first computing operation, the second computing operation, the third computing operation, or the fourth computing operation comprises resolving an exception event associated with the digital request data object, wherein the exception event comprises a disruption in processing the digital request data object at a first stage based on a failure of the digital request data object to meet a requirement or condition during the first stage, and wherein the requirement or condition is based on at least one of: a lack of additional input from a user associated with the digital request data object; profile data of the user associated with the digital request data object; a lack of analysis data or computing result data from other applications associated with the multi-application network; a time threshold to process the digital request data object; profile data associated with a device associated with the digital request data object; credential data associated with a user of the multi-application network; or a lack of client profile data associated with a client corresponding to the digital request data object.

2. The method of claim 1, wherein one or more of the first input or the second input is a natural language input.

3. The method of claim 1, wherein the profile data comprises:
first access data indicating an access protocol for a user that defines specific aspects of the digital request data object that is accessible to the user.

4. The method of claim 1, wherein the trajectory data indicates or links the one or more computing operations previously executed on the digital request data object.

5. The method of claim 1, wherein the metadata comprises:
temporal data associated with creating and storing the digital request data object;
location data associated with creating, accessing, and operating on the digital request data object;
user data associated with creating the digital request data object; and
a file or document type associated with the digital request data object.

6. The method of claim 1, wherein the digital request data object comprises a document or a file outlining one or more of:
account data associated with a client request, or
data indicating operations required to resolve the exception event associated with the digital request data object.

7. The method of claim 1, wherein one of the first computing operation, the second computing operation, the third computing operation, or the fourth computing operation comprises a computing operation that is used to determine the exception event associated with the digital request data object.

8. The method of claim 1, wherein the first digital record and the second digital record are displayed on a single user interface that is configured to display a plurality of computing operation results generated from analysis operations executed by one or more applications associated with the first computing operation, the second computing operation, the third computing operation, or the fourth computing operation.

9. The method of claim 1, wherein the first input or the second input is received by an artificial intelligence or a machine learning engine that is configured to track or assimilate a trajectory of one or more inputs including the first input and the second input to resolve at least one exception event associated with the digital request data object.

10. The method of claim 1, wherein transitioning the digital request data object from the first data state to the second data state comprises updating at least one data element of the digital request data object, the at least one data element comprising one or more of identifier data or processing stage data.

11. The method of claim 1, wherein one or more of the first state data and the second state data indicate one or more changes to data elements associated with the digital request data object.

12. An apparatus for generating one or more digital records indicating one or more computing operations and state data associated with a digital request data object in a multi-application network, the apparatus comprising:
one or more computing system processors; and
memory storing instructions that, when executed by the one or more computing system processors, causes the apparatus to:
receive a first input associated with the digital request data object, the digital request data object comprising or associated with a file stored in one or more databases associated with the multi-application network;

determine context data for the digital request data object based on at least the first input, the context data comprising:
  profile data comprising user data associated with the digital request data object,
  trajectory data associated with one or more computing operations previously executed on the digital request data object, and
  metadata associated with the digital request data object;

execute, based on the context data and the first input:
  a first computing operation that transitions the digital request data object from a first data state to a second data state, and
  a second computing operation that does not transition the digital request data object from the first data state to the second data state;

generate a first digital record indicating:
  summary data for the first computing operation, and
  first state data associated with transitioning the digital request data object from the first data state to the second data state;

update the context data based on the summary data for the first computing operation, and the first state data associated with the transitioning the digital request data object from the first data state to the second data state, both associated with the first digital record;

receive a second input associated with the digital request data object;

execute, based on the updated context data or the second input:
  a third computing operation that transitions the digital request data object from the second data state to a third data state, and
  a fourth computing operation that transitions the digital request data object from the third data state to a fourth data state;

generate, a second digital record indicating:
  summary data for the third computing operation and the fourth computing operation, and
  second state data associated with transitioning the digital request data object from:
    the second data state to the third data state, and
    the third data state to the fourth data state; and update, using the one or more computing system processors, the context data based on the summary data for the third computing operation and the fourth computing operation, and the second state data associated with the transitioning the digital request data object from the second data state to the third data state and then the third data state to the fourth data state, both associated with the second digital record, wherein at least one of the first computing operation, the second computing operation, the third computing operation, or the fourth computing operation comprises resolving an exception event associated with the digital request data object, wherein the exception event comprises a disruption in processing the digital request data object at a first stage based on a failure of the digital request data object to meet a requirement or condition during the first stage, and wherein the requirement or condition is based on at least one of: a lack of additional input from a user associated with the digital request data object; profile data of the user associated with the digital request data object; a lack of analysis data or computing result data from other applications associated with the multi-application network; a time threshold to process the digital request data object; profile data associated with a device associated with the digital request data object; credential data associated with a user of the multi-application network; or a lack of client profile data associated with a client corresponding to the digital request data object.

13. The apparatus of claim 12, wherein the profile data comprises:
first access data indicating an access protocol for a user that defines specific aspects of the digital request data object that is accessible to the user.

14. The apparatus of claim 12, wherein the trajectory data indicates or links the one or more computing operations previously executed on the digital request data object.

15. The apparatus of claim 12, wherein one of the first computing operation, the second computing operation, the third computing operation, or the fourth computing operation comprises a computing operation that is used to determine or resolve the exception event associated with the digital request data object.

16. The apparatus of claim 12, wherein the first digital record and the second digital record are displayed on a single user interface that is configured to display a plurality of computing operation results generated from analysis operations executed by one or more applications associated with the first computing operation, the second computing operation, the third computing operation, or the fourth computing operation.

17. The apparatus of claim 12, wherein the first input or the second input is received by an artificial intelligence or a machine learning engine that is configured to track or assimilate a trajectory of one or more inputs including the first input and the second input operations that resolve at least one exception event associated with the digital request data object.

18. A method for generating one or more digital records indicating one or more computing operations and state data associated with a digital request data object in a multi-application network, the method comprising:
receiving, using one or more computing device processors, a first input associated with the digital request data object, the digital request data object comprising a document stored in one or more databases associated with the multi-application network;

determining, using the one or more computing device processors, context data for the digital request data object based on at least the first input, the context data comprising one or more of:
  profile data comprising user data associated with the digital request data object,
  trajectory data associated with one or more computing operations previously executed on the digital request data object, and
  metadata associated with the digital request data object;

executing, using the one or more computing device processors, based on the context data and the first input:
  a first computing operation that transitions the digital request data object from a first data state to a second data state, and
  a second computing operation that does not transition the digital request data object from the first data state to the second data state;

generating, using the one or more computing device processors, a first digital record indicating:
  summary data for the first computing operation, and
  first state data associated with transitioning the digital request data object from the first data state to the second data state;
updating, using the one or more computing device processors, the context data based on the summary data for the first computing operation, and the first state data associated with the transitioning the digital request data object from the first data state to the second data state, both associated with the first digital record;
receiving, using the one or more computing device processors, a second input associated with the digital request data object;
executing, using the one or more computing device processors, based on the updated context data and the second input:
  a third computing operation that transitions the digital request data object from the second data state to a third data state, and
  a fourth computing operation that transitions the digital request data object from the third data state to a fourth data state;
generating, using the one or more computing device processors, a second digital record indicating:
  summary data for the third computing operation or the fourth computing operation, and
  second state data associated with transitioning the digital request data object from:
    the second data state to the third data state, and
    then the third data state to the fourth data state; and
updating, using the one or more computing device processors, the context data based on the summary data for the third computing operation and the fourth computing operation, and the second state data associated with the transitioning the digital request data object from the second data state to the third data state and then the third data state to the fourth data state, both associated with the second digital record,
wherein at least one of the first computing operation, the second computing operation, the third computing operation, or the fourth computing operation comprises resolving an exception event associated with the digital request data object,
wherein the exception event comprises a disruption in processing the digital request data object at a first stage based on a failure of the digital request data object to meet a requirement or condition during the first stage, and
wherein the requirement or condition is based on at least one of: a lack of additional input from a user associated with the digital request data object; profile data of the user associated with the digital request data object; a lack of analysis data or computing result data from other applications associated with the multi-application network; a time threshold to process the digital request data object; profile data associated with a device associated with the digital request data object; credential data associated with a user of the multi-application network; or a lack of client profile data associated with a client corresponding to the digital request data object.

19. The method of claim 18, wherein the first input or the second input is received by a digital assistant associated with the multi-application network, the digital assistant comprising an artificial intelligence or a machine learning engine that is configured to track or assimilate a trajectory of one or more inputs including the first input and the second input to recommend one or more analysis operations that resolve at least one exception event associated with the digital request data object.

20. The method of claim 1, wherein the requirement or condition is based on the at least one of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; the lack of client profile data associated with the client corresponding to the digital request data object, comprises at least two of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; or the lack of client profile data associated with the client corresponding to the digital request data object.

21. The method of claim 1, wherein the requirement or condition is based on the at least one of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; the lack of client profile data associated with the client corresponding to the digital request data object, comprises at least three of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; or the lack of client profile data associated with the client corresponding to the digital request data object.

22. The method of claim 1, wherein the requirement or condition is based on the at least one of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; the lack of client profile data associated with the client corresponding to the digital request data object, comprises at least four of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; or the lack of client profile data associated with the client corresponding to the digital request data object.

23. The method of claim 1, wherein the requirement or condition is based on the at least one of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; the lack of client profile data associated with the client corresponding to the digital request data object, comprises at least five of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; or the lack of client profile data associated with the client corresponding to the digital request data object.

24. The method of claim 1, wherein the requirement or condition is based on the at least one of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; the lack of client profile data associated with the client corresponding to the digital request data object, comprises at least six of: the lack of additional input from the user associated with the digital request data object; the profile data of the user associated with the digital request data object; the lack of analysis data or computing result data from the other applications associated with the multi-application network; the time threshold to process the digital request data object; the profile data associated with the device associated with the digital request data object; the credential data associated with the user of the multi-application network; or the lack of client profile data associated with the client corresponding to the digital request data object.

25. The method of claim 1, wherein the exception event associated with the digital request data object is detected automatically using an application programming interface (API) that accesses and processes a first stage-specific application or a second stage-specific application associated with the digital request data object.

* * * * *